(12) United States Patent
Liao

(10) Patent No.: US 7,635,327 B1
(45) Date of Patent: Dec. 22, 2009

(54) MULTI-LAYERED TOOL MAGAZINE OF CNC MACHINE

(75) Inventor: Rock Liao, Taipei (TW)

(73) Assignee: Quaser Machine Tools, Inc., Taichung (TW)

(*) Notice: Subject to any disclaimer, the term of this patent is extended or adjusted under 35 U.S.C. 154(b) by 0 days.

(21) Appl. No.: 12/416,927

(22) Filed: Apr. 2, 2009

(51) Int. Cl.
*B23Q 3/157* (2006.01)

(52) U.S. Cl. .................... 483/37; 483/40; 483/44; 483/48; 483/49; 483/63; 483/68

(58) Field of Classification Search ............ 483/63, 483/64, 68, 37, 40–41, 44, 46, 48–49, 51, 483/52, 53, 60–62
See application file for complete search history.

(56) References Cited

U.S. PATENT DOCUMENTS 4,119,213 A * 10/1978 Sato et al. .................. 483/67
4,306,350 A * 12/1981 Kielma et al. .............. 483/37
4,625,387 A * 12/1986 Stoilov ....................... 483/37
4,920,632 A * 5/1990 Babel ......................... 483/68
5,107,581 A * 4/1992 Reuter et al. ............... 483/61

* cited by examiner

*Primary Examiner*—Erica E Cadugan
(74) *Attorney, Agent, or Firm*—Chun-Ming Shih

(57) ABSTRACT

A multi-layered tool magazine of a CNC machine having multiple specifications and fast tool-changing speed, includes a racket connecting to the CNC machine and being disposed with more than one set of tool magazine modules, a tool selecting module and a tool changing module. The tool changing module includes a tool selecting disk disposed with two tool selecting portions at both ends thereof respectively, and the tool selecting disk can move up and down corresponding to the tool magazine module. Furthermore, the tool changing module includes a tool changing rod disposed corresponding to the shaft of the CNC machine and a positioning point of the tool selecting module; therefore, it can increase the number of tools of the tool magazine and prepare the tools for the next process quickly in advance to exchange the tools with high speed and to further enhance the processing efficiency.

5 Claims, 7 Drawing Sheets

MULTI-LAYERED TOOL MAGAZINE OF CNC MACHINE

BACKGROUND OF THE INVENTION

1. Field of the Invention

The present invention relates to a tool storage of a CNC (computer numerical control) machine, and more particularly, to a high-speed, high volume, multi-layered tool magazine of a CNC machine to swiftly exchange tools to further enhance the processing efficiency.

2. Description of the Prior Art

In order to improve processing efficiency and precision, computer numerical controlled machines are the trends for machining tools, and their processing tool types are evolving as well, which include the traditional drilling, milling, turning tools and the newer tapping, grinding, positioning and imaging tools; besides, under one processing type, there could be different processing configurations and specifications, therefore a lot of tools are required. Hence, the CNC machine is usually disposed with a tool magazine for placing different kinds of machining tools. The traditional tool magazine mainly comprises of rotary tool magazine or chain type tool magazine wherein the turntable or the chain of the tool magazine is equidistantly disposed with a plurality of tool seats thereon, and the tool magazine is disposed with a rotatable tool changing device for pulling, rotating and inserting tools between the tool magazine and the tool shaft of the CNC machine synchronously.

However, the traditional tool magazine, no matter it is a rotary type or a chain type tool magazine, has limitation in the storage volume of tools. Therefore, the CNC machine is set to work with one single function to reduce the number of tool types in the tool magazine. If there should be processing requirements having small quantity and large variety characteristics, the whole tool magazine has to be changed and the new tool magazine has to be positioned and aligned; therefore, it is necessary to improve the whole process since the time for the whole process is greatly increased.

In other words, it is necessary to increase the number of tools in the tool magazine to meet requirements of small quantity and large variety without affecting the tool changing process and its changing time, thereby enhancing the processing efficiency.

In view of this, the inventor of the present invention has put a lot of efforts in studying the deficiencies in the number of tools in the tool magazine; after years of constant research, the inventor has proposed a multi-layered tool magazine of CNC machine to solve the problems in processing requirements of small quantity and large variety.

SUMMARY OF THE INVENTION

The present invention discloses a multi-layered tool magazine of CNC machine, which has larger number of tools in the tool magazine and can exchange the tools with high speed to effectively improve the efficiency for processing work pieces of small quantity.

In order to achieve the objects of the present invention, a multi-layered tool magazine is disposed corresponding to a tool shaft of a CNC machine, wherein the tool magazine comprises:

a racket;

at least one tool magazine module disposed with two wheel set at both ends of the racket respectively, one of the wheel set comprising a driving unit, and a tool chain being consisted of tool seats and connecting the two wheel sets in a ring configuration;

a tool selecting module disposed with a slide rail mount at an edge of a side opposite to the tool magazine, the tool selecting module having a driving unit disposed at a top end of the slide rail mount, the driving unit driving a saddle slidably disposed on the slide rail mount to move up and down, and the saddle comprising a disk being able to move back and forth corresponding to a tool selecting point of the tool magazine and being disposed with a first tool selecting portion and a second tool selecting portion for holding tools at both ends of the disk respectively, and the saddle comprising a telescopic cylinder disposed thereon to drive the disk to move back and forth, wherein the first and the second tool selecting portion can correspondingly pull out tools from specific tool seats from the tool magazine module and exchange the held tools;

a tool changing module disposed correspondingly to a tool exchanging point on the tool shaft of the CNC machine, the tool changing module comprising a base connecting to the CNC machine, and the base comprising a saddle disposed thereon, the saddle comprising a rod being able to move back and forth and to rotate, the rod having its two end disposed with a first tool changing portion and a second tool changing portion for holding tools respectively, the saddle comprising a telescopic cylinder disposed thereon to drive the rod to move back and forth, a driving unit being provided on a side of the saddle for driving the rod to rotate, wherein the first and the second tool changing portion can correspondingly exchange the held tools among the first and the second tool selecting portion of the tool selecting module and the tool shaft.

Therefore, the present invention can increase the number of tools in the tool magazine and can prepare the tools for the next process at the tool changing position in advance to exchange the tools with high speed, meanwhile, the tools for the previous process will be returned to the tool magazine to further enhance the processing efficiency and to increase the product competitiveness for the company.

For better understanding of the constitution, characteristics and other objects of the present invention, the present invention is illustrated by referring to the preferred embodiments along with the drawings.

BRIEF DESCRIPTION OF THE DRAWINGS

The drawings disclose an illustrative embodiment of the present invention, which serves to exemplify the various advantages and objects hereof, and are as follows.

DETAILED DESCRIPTION OF THE PREFERRED EMBODIMENT

The present invention discloses a multi-layered tool magazine of CNC machine. In preferred embodiments and accompanying figures, the descriptions such as back and forth, left and right, up and down, top and bottom, horizontal and parallel and etc. of the elements are illustrated as examples and not to limit the scope of the present invention. The sizes specified in the figures and the description can be varied as long as they fall within the scope of the present invention.

Figure 1:
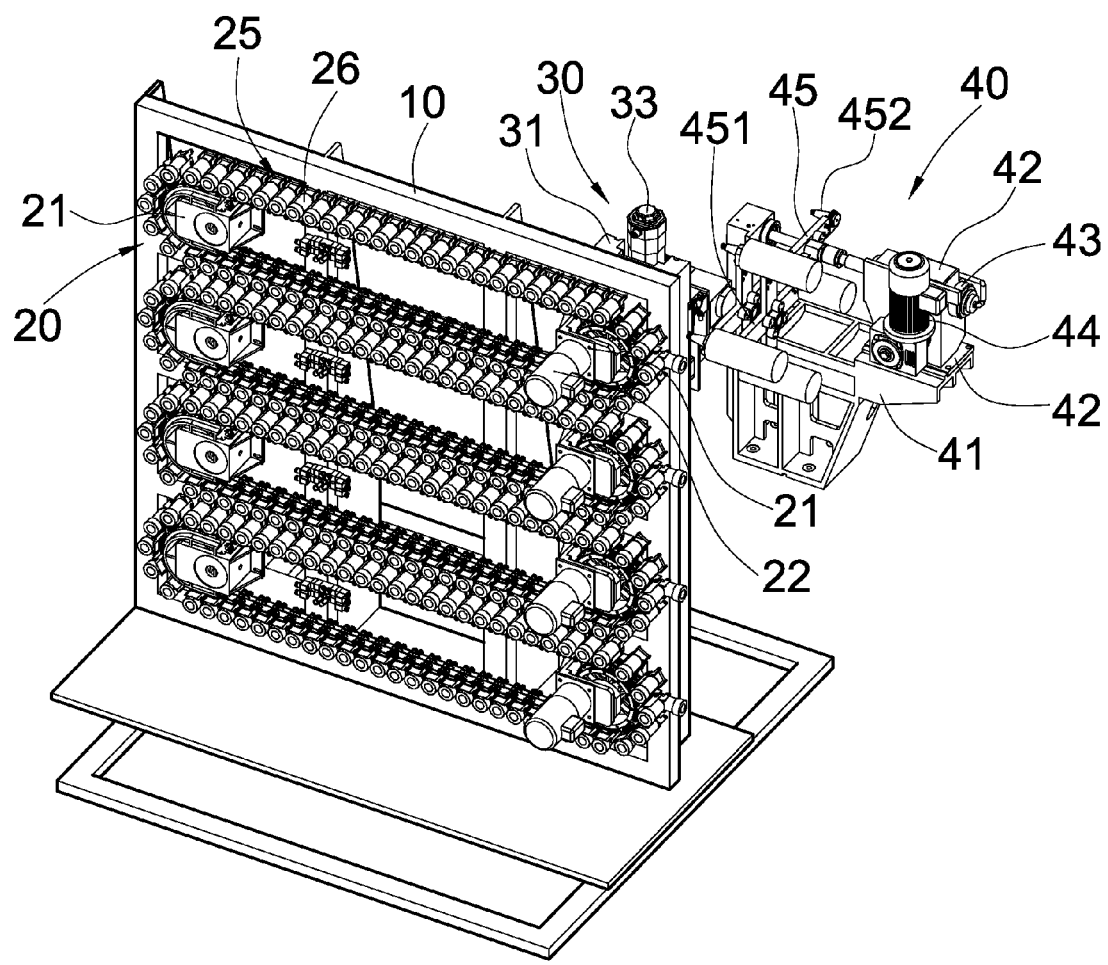
FIG. 1 shows a perspective view of a multi-layered tool magazine in the present invention to illustrate the configuration and the relation of the elements of the multi-layered tool magazine.
Figure 2:
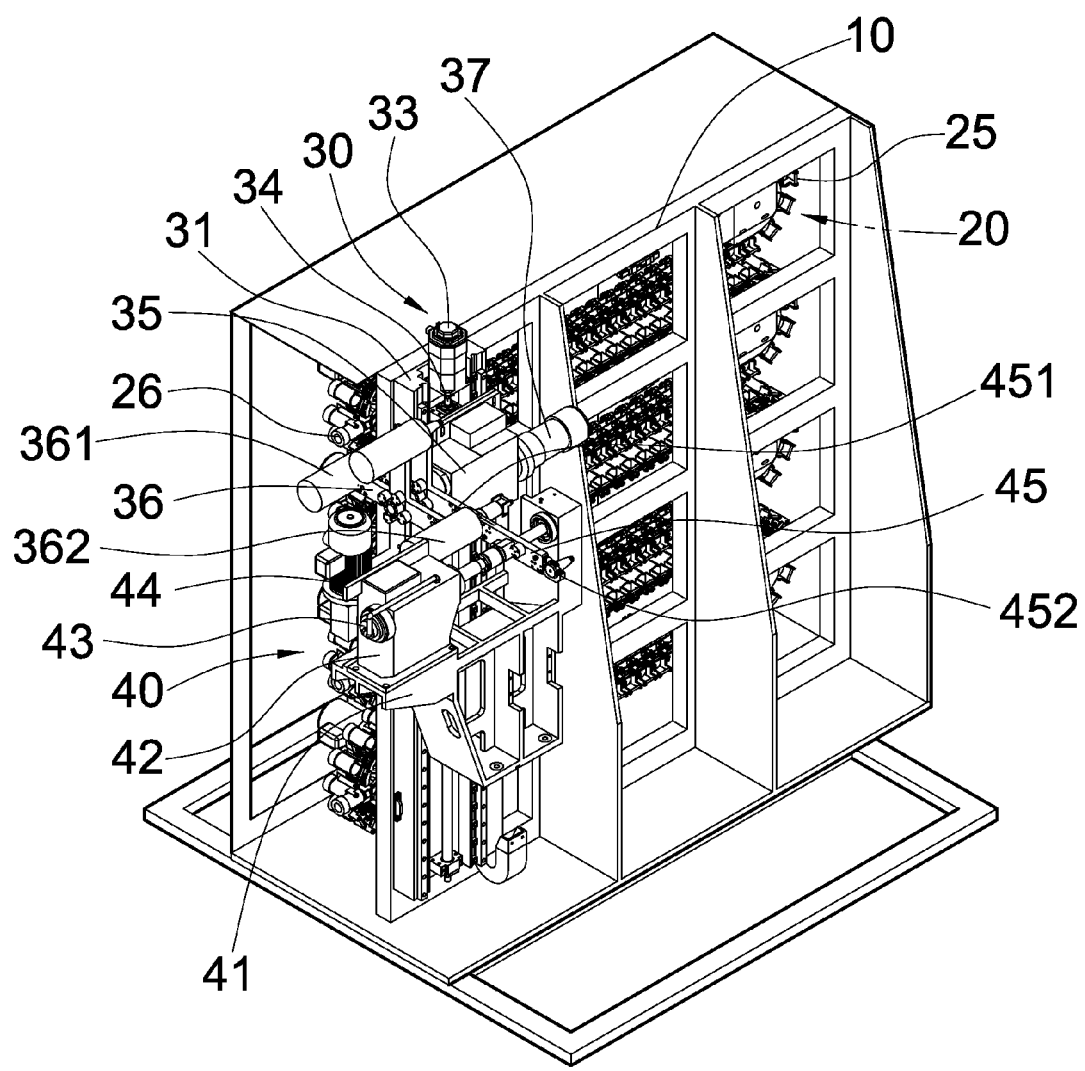
FIG. 2 shows another perspective view of the multi-layered tool magazine system in the present invention to illustrate the configuration of another side of the multi-layered tool magazine.
Figure 3:
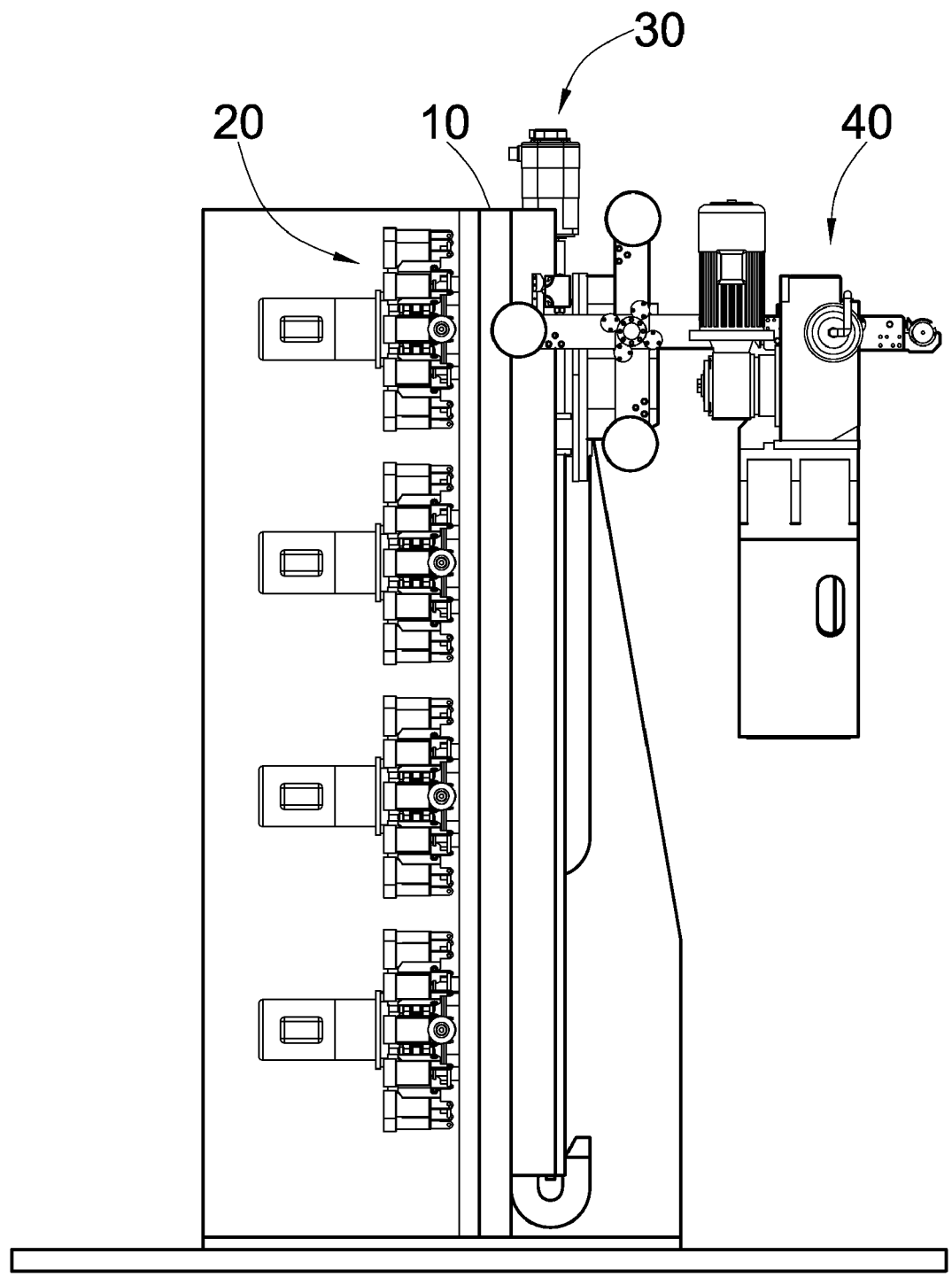
FIG. 3 shows a side view of the multi-layered tool magazine exchanging tools with a CNC machine.
Figure 4:
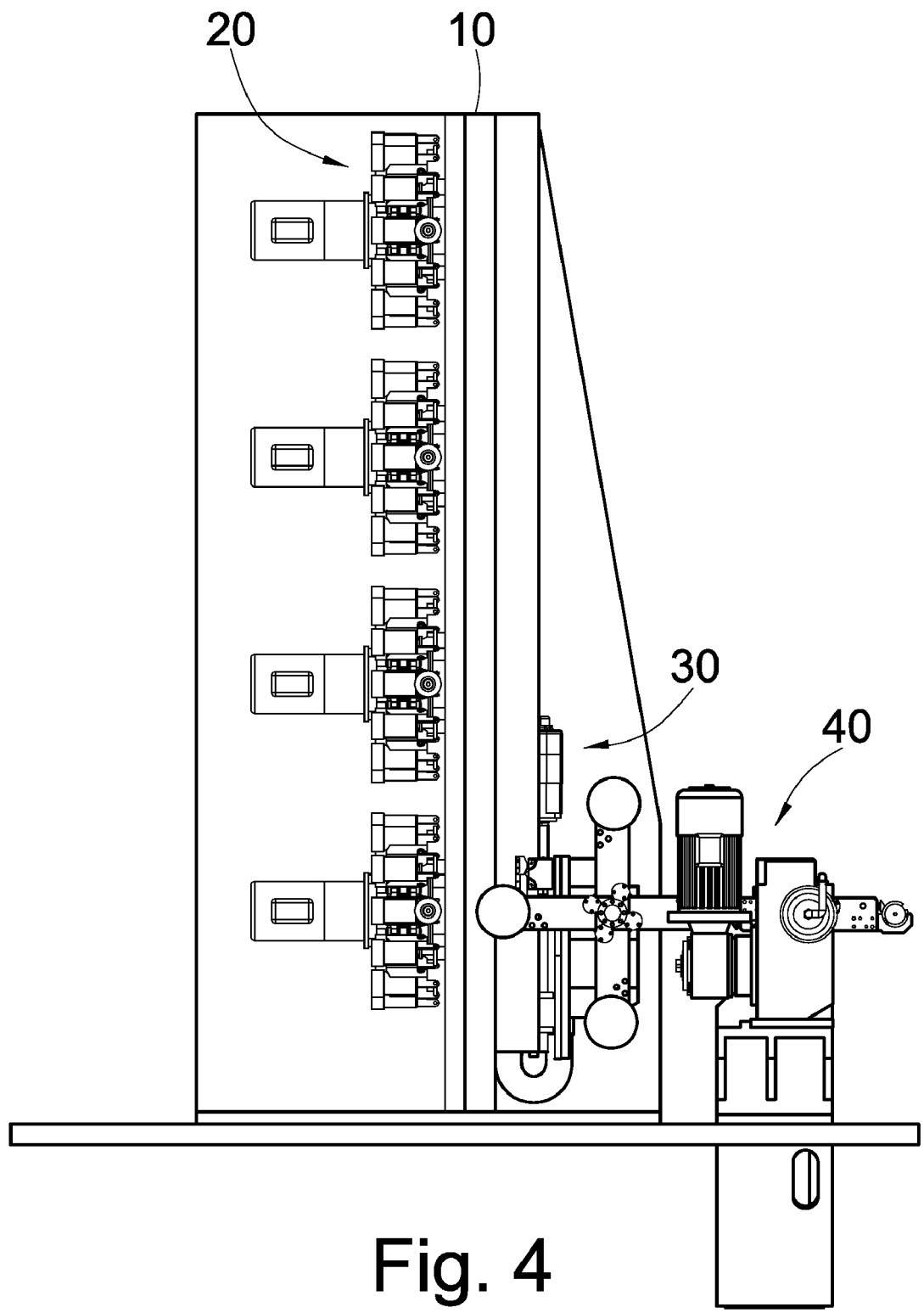
FIG. 4 to FIG. 7 illustrate movements of a tool-selecting module of the multi-layered tool magazine.
Figure 5:
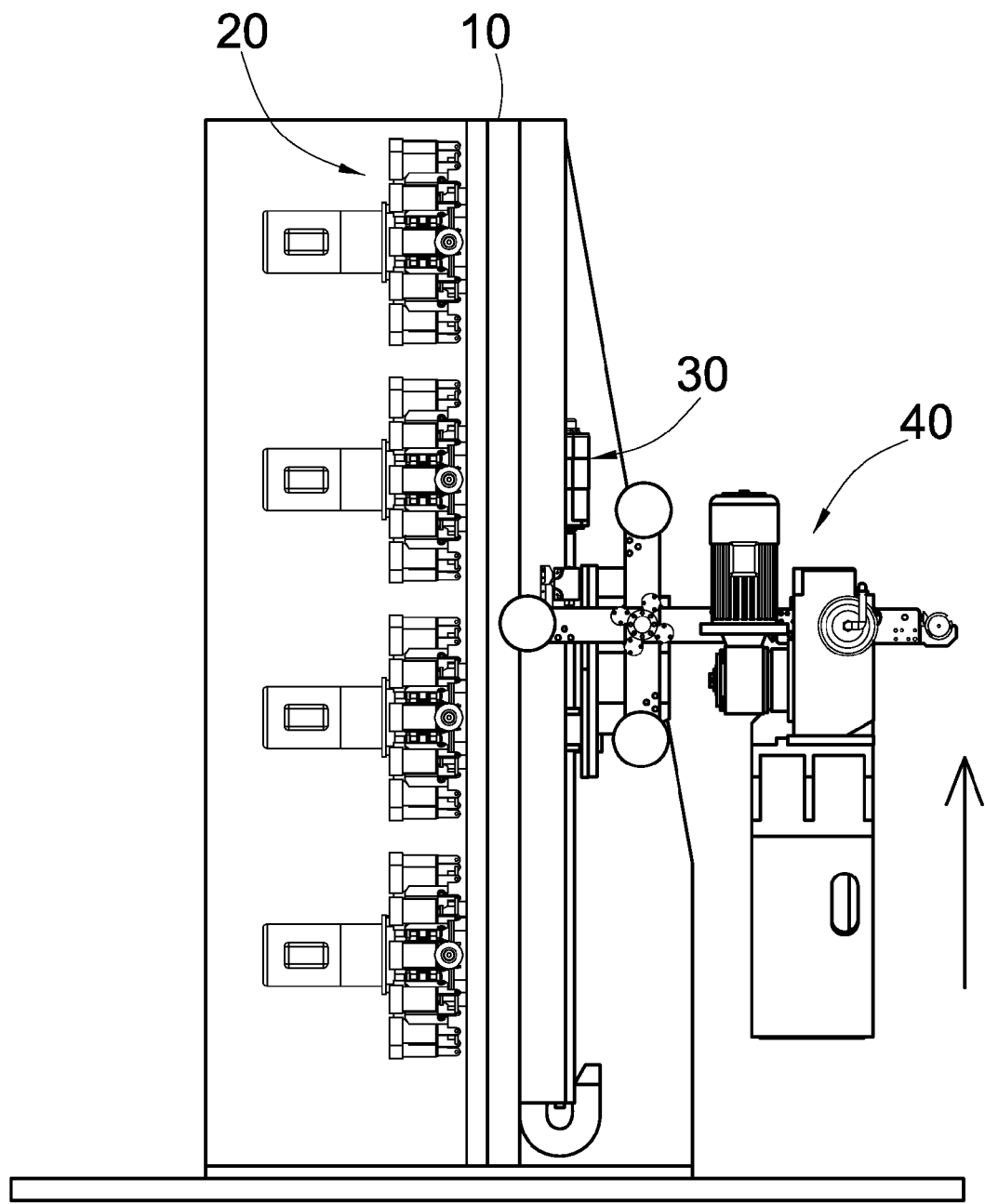
Figure 6:
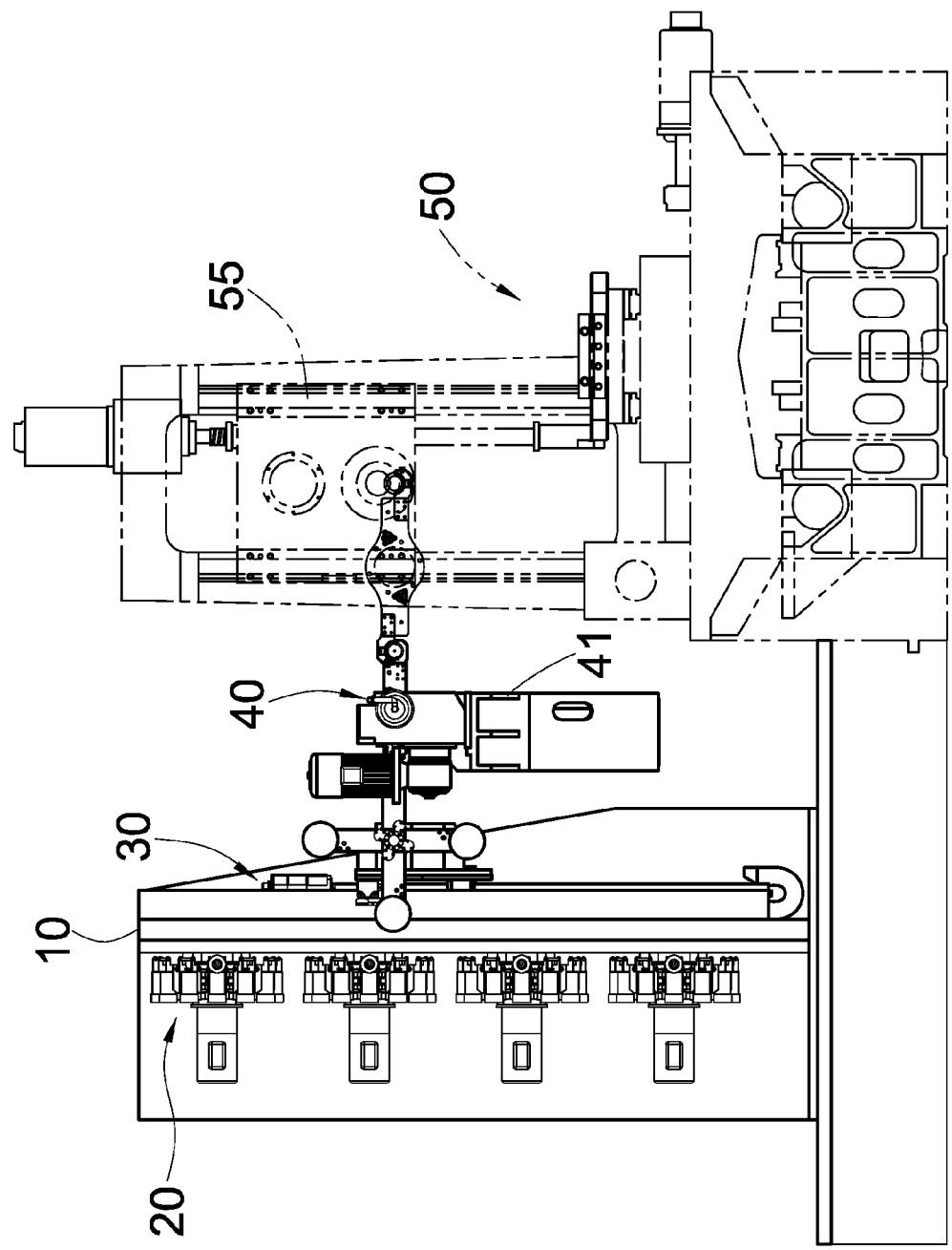
Figure 7:
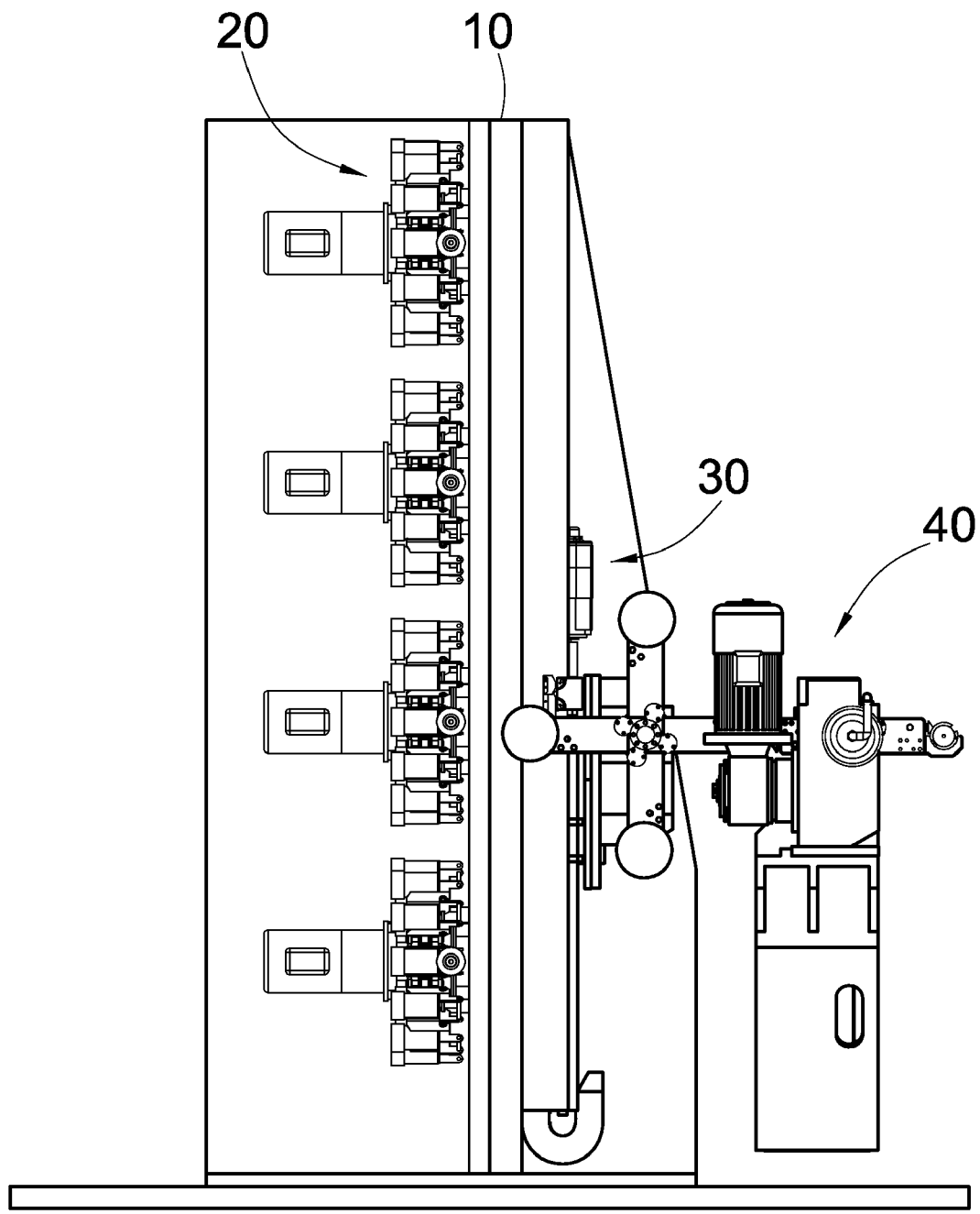

The multi-layered tool magazine disclosed in the present invention is applicable in the CNC machine field. Please refer to FIG. 1, FIG. 2, FIG. 3, and FIG. 4 to FIG. 7, the multi-layered tool magazine mainly comprises a racket 10, at least one tool magazine module 20, a tool selecting module 30, and a tool changing module 40, wherein the tool selecting module 30 can move corresponding to each tool magazine module 20, and the tool selecting module 30 can exchange tools between a tool changing module 40 of the CNC machine 50 and the tool shaft 55 of the machine 50, as shown in FIG. 3.

The racket 10 is used for connecting with the CNC machine 50 and for assembling and protecting other modules in the present invention; the CNC machine 50 comprises a working platform which can move in an X-axis and a Y-axis along the servo axes, and a tool shaft 55 which can move in a Z-axis along the servo axis; the programmed CNC 50 can control the working platform and the tool shaft 55 to move and rotate with high speed for moving the work piece and operating the tool on the tool shaft 55 to process the work piece on the working platform.

The tool magazines 20 are disposed equidistantly from top to bottom on the rack 10 and parallel to each other. Each tool magazine module 20 is disposed with two wheel sets 21 at both ends of the racket 10 respectively, one of the wheel set 21 comprises a driving unit 22, which is selected from servo motors capable of providing accurate positioning, and a tool chain 25 consisted of tool seats 26 is connected with the two wheel sets in a ring configuration. The tool chain 25 of the tool magazine module 20 can rotate the tool seat 26 for 90 degrees at a specific tool selecting point for the tool selecting module 30 to pull out the tool on the tool seat 26.

The tool selecting module 30 is disposed with a slide rail mount 31 at an edge of a side of the racket 10 opposite to the tool magazine module 20, and the tool selecting module 30 has a driving unit 33 disposed at a top end of the slide rail mount 31. The driving unit 33 can be selected from a servo motor capable of providing accurate positioning, wherein the driving unit 33 can drive a lead screw 34 extending from the center of the slide rail mount 31, and the lead screw 34 comprises a saddle 35 disposed thereon for slidably moving on the slide rail mount 31 The saddle 35 is driven by the driving unit 33 to move up and down, and the saddle 35 comprises a disk 36 which can move back and forth corresponding to a tool selecting point of the tool magazine module and is disposed with a first tool selecting portion 361 and a second tool selecting portion 362 for holding tools at both end of the disk 36 respectively. Furthermore, the saddle 35 comprises a telescopic cylinder 37 disposed thereon to drive the disk 36 to move back and forth, wherein the first tool selecting portion 361 and the second tool selecting portion 362 can selectively and correspondingly pull out tools from specific tool seats of the tool magazine module 20 and exchange the held tools with the tool changing module 40.

The tool changing module 40 is disposed correspondingly to a tool exchanging point on the tool shaft 55 of the CNC machine 50. The tool changing module 40 comprises a base 41 connecting to the CNC machine 50, and the base 41 comprises a saddle 42 disposed thereon. The saddle 42 comprises a rod 45 which can move back and forth and to rotate, and the rod 45 has its two end disposed with a first tool changing portion 451 and a second tool changing portion 452 for holding tools respectively. The saddle 42 comprises a telescopic cylinder 43 disposed thereon to drive the rod 45 to move back and forth, and a driving unit 44 is provided on a side of the saddle 42 for driving the rod 45 to rotate, wherein the driving unit 44 can be selected from servo motors capable of providing accurate positioning to let the first 451 and the second tool changing portion 452 selectively and correspondingly pull out tools from the tool selecting module 30 and rotate/exchange the held tools with the tool shaft 55 of the CNC machine 50.

Hence, the multi-layered tool magazine of CNC machine, which can provide large volume of tools and high-speed tool exchanging capabilities, is implemented.

As to the operations of the multi-layered tool magazine of CNC machine, please refer to FIG. 1, FIG. 2, FIG. 3, and FIG. 4 to FIG. 7. During operations, the tool selecting module 30 is used for pulling out prepared tools; firstly the corresponding tool chain 25 of the tool magazine module 20 moves the corresponding tool seat 26 to the tool selecting point. Please refer to the tool magazine module of the lowest layer in FIG. 4 in the embodiment and rotate the tool seat 26 to be ready for tool selection; then, the tool selecting module 30 moves to the tool selecting point of the tool magazine module 20. Driven by the telescopic cylinder 37 of the tool selecting module 30, the tool selecting module 30 uses the first tool selecting portion 361 of the tool selecting module 30 to pull out the prepared tool on the tool seat 26 of the disk 36; afterwards, the tool selecting module 30 uses the driving unit 33 to move the saddle 35 to the tool exchanging point and lets the disk 36 and the first tool selecting portion 361 holding the prepared rotate to the tool exchanging point to be ready for the tool shaft 55 of the CNC machine 50 to exchange tools; later, when the tool on the tool shaft 55 of the CNC machine 50 has finished the processing of the previous stage, the tool shaft 55 moves the used tool to the tool exchanging point and uses the first 451 and the second tool changing portion 452 of the tool changing module 40 to pull out the tools of the tool shaft 55 and the tool selecting module 30 simultaneously and then lets the rod 45 of the tool changing module 40 rotate to insert the tools synchronously so as to insert the prepared tool on the tool shaft 55, and to insert the used tool on the tool selecting module 30 to complete the tool exchanging process; finally, the tool selecting module 30 moves to the tool magazine 20 having the prepared tool for the next process, and rotates the disk 36 of the tool selecting module 30 to obtain the prepared tool and then returns the used tool as described before. It is noted that the tool selecting and exchanging processes will repeat on and on to speed the preparation process for tools and to increase the storage volume of the tool magazine to effectively improve the processing efficiency.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A multi-layered tool magazine of a CNC (computer numerical control) machine, which is disposed corresponding to a tool shaft of the CNC machine, wherein the tool magazine comprising:
   a racket;
   at least one tool magazine module disposed with two wheel sets at both ends of the racket respectively, one of the wheel sets comprising a first driving unit, and a tool chain being consisted of tool seats and connecting the two wheel sets in a ring configuration;

a tool selecting module disposed with a slide rail mount at an edge of a side of the racket opposite to the at least one tool magazine module, the tool selecting module having a second driving unit disposed at a top end of the slide rail mount, the second driving unit driving a first saddle slidably disposed on the slide rail mount to move up and down, and the first saddle comprising a disk being able to move back and forth corresponding to a tool selecting point of the at least one tool magazine module and being disposed with a first tool selecting portion and a second tool selecting portion for holding tools at both ends of the disk respectively, and the first saddle comprising a telescopic cylinder disposed thereon to drive the disk to move back and forth, wherein the first and the second tool selecting portion can correspondingly pull out tools from specific tool seats of the at least one tool magazine module and exchange the held tools; and a tool changing module disposed correspondingly to a tool exchanging position of the tool shaft of the CNC machine, the tool changing module comprising a base connecting to the CNC machine, and the base comprising a second saddle disposed thereon, the second saddle comprising a rod being able to move back and forth and to rotate, the rod having two end thereof disposed with a first tool changing portion and a second tool changing portion for holding tools respectively, the second saddle comprising a telescopic cylinder disposed thereon to drive the rod to move back and forth, a third driving unit being provided on a side of the second saddle for driving the rod to rotate, wherein the first and the second tool changing portion can correspondingly exchange the held tools among the first and the second tool selecting portion of the tool selecting module and the tool shaft.

2. The multi-layered tool magazine of a CNC machine as claimed in claim 1, wherein a plurality of the tool magazine modules are disposed equidistantly from top to bottom on the racket and parallel to each other.

3. The multi-layered tool magazine of a CNC machine as claimed in claim 1, wherein the first driving unit of the at least one tool magazine module, the second driving unit of the tool selecting module, and the third driving unit of the tool changing module are selected from servo motors which can provide accurate positioning.

4. The multi-layered tool magazine of a CNC machine as claimed in claim 1, wherein the tool chain of the at least one tool magazine module can rotate a respective one of the tool seats for 90 degrees at a specific tool selecting point for the tool selecting module to pull out the tool on the respective one tool seat.

5. The multi-layered tool magazine of a CNC machine as claimed in claim 1, wherein the second driving unit of the tool selecting module is disposed with a lead screw corresponding to the slide rail mount, and the first saddle is disposed on the lead screw.

* * * * *